(12) United States Patent
Kumar

(10) Patent No.: US 8,612,941 B2
(45) Date of Patent: Dec. 17, 2013

(54) SYSTEM AND METHOD FOR ANALYSIS OF A LARGE CODE BASE USING PARTITIONING

(75) Inventor: Shrawan Kumar, Pune (IN)

(73) Assignee: Tata Consultancy Services Limited, Mumbai (IN)

(*) Notice: Subject to any disclaimer, the term of this patent is extended or adjusted under 35 U.S.C. 154(b) by 260 days.

(21) Appl. No.: 13/104,199

(22) Filed: May 10, 2011

(65) Prior Publication Data

US 2012/0291004 A1 Nov. 15, 2012

(51) Int. Cl.
G06F 9/44 (2006.01)

(52) U.S. Cl.
USPC .......................................................... 717/131

(58) Field of Classification Search
USPC ................... 717/127, 131, 132, 133
See application file for complete search history.

(56) References Cited

U.S. PATENT DOCUMENTS

| 5,828,883 | A | * | 10/1998 | Hall | 717/133 |
| 5,999,737 | A | | 12/1999 | Srivastava | |
| 6,694,290 | B1 | * | 2/2004 | Apfelbaum et al. | 703/22 |
| 6,792,597 | B1 | | 9/2004 | Halpern | |
| 6,986,125 | B2 | | 1/2006 | Apuzzo et al. | |
| 7,559,055 | B2 | * | 7/2009 | Yang et al. | 717/127 |
| 2010/0251221 | A1 | | 9/2010 | Nori et al. | |
| 2010/0281306 | A1 | | 11/2010 | Sinha | |
| 2011/0154300 | A1 | * | 6/2011 | Rao et al. | 717/133 |

OTHER PUBLICATIONS

Anton et al., Towards the Industrial Scale Development of Custom Static Analyzers, Proceedings of the NIST Static Analysis Summit, 2006, Gaithersburg, MD, USA.

Spoon et al., Dynamic Data Polyvariance Using Source-Tagged Classes, DLS '05 Proceedings of the 2005 symposium on Dynamic languages, 2005, ACM New York, NY, USA.

* cited by examiner

Primary Examiner — Anna Deng
(74) Attorney, Agent, or Firm — Akerman LLP; Peter A. Chiabotti; Roy Zachariah

(57) ABSTRACT

A system and method for analysis of a large code base using partitioning. The present application relates to management of large code bases, by enabling fragmentation of large code bases into smaller code clusters. Further the system and method analyze small code clusters individually and combining the results obtained therefrom, illustrating to programmers the combined result for the entire code base.

13 Claims, 10 Drawing Sheets

SYSTEM AND METHOD FOR ANALYSIS OF A LARGE CODE BASE USING PARTITIONING

FIELD OF THE INVENTION

The present application relates to management of large code bases, by enabling fragmentation of large code bases into smaller code clusters. More particularly, the application relates to method of analysis of small code clusters individually and combining the results obtained therefrom, illustrating to the programmers the combined result for the entire code base.

BACKGROUND

Software codes are growing day by day in size and complexity. Static program analysis based tools and techniques are being increasingly used for various purposes such as defect detection in code, code reviews, code re-engineering, code reverse engineering, quality assurance of code and software program understanding.

Today, static code analysis based tools are being widely applied to detect defects much earlier in the Software Development Life Cycle (SDLC). However, scalability has always been the bottleneck for Static Code Analysis Tools.

Lots of efforts have been made to develop static program analysis based tools, but all such tools available till today can analyze only a limited size of code. In practice, a software system may consist of an extra ordinary large code base; to which static program analysis based tools may not be scalable. Many real world systems have code length beyond 5-6 millions Lines of Code (LOC). No such static program analysis based tools can be scaled up to this size of code for analyzing the whole code base as a single cluster. Analysis of such large code base as a whole with existing resource constraints, such as memory and time, in real world is a challenge.

In order to analyze a large code base, with improved precision and scalability it is desirable to have a single analyzable cluster irrespective of the code length. Since the real world software systems are manifold in size compared to the size which can be handled by existing technologies, there is a need to address the inadequacy of the traditional code analysis tools for analyzing a large code base as a single cluster.

However, the existing approach to address this problem of analyzing a large code base is to scale up the system for analyzing the code base that results into poor precision and additional burden on the computing resources. Thus, the existing method and systems are not capable of analyzing the large code base due to code length and insufficiency to scale up to the bigger size of code to analyze the whole code base as a single cluster.

It is observed that the prior art remarkably fails to disclose an efficient method and system for analyzing a large code base with improved precision and scalability of a single analyzable cluster irrespective of the code length. The existing solutions generally are not capable of analyzing the large code base due to code length and insufficiency to scale up to the bigger size of code to analyze the whole code base as a single cluster.

SUMMARY

Before the present systems and methods, enablement are described, it is to be understood that this application is not limited to the particular systems, and methodologies described, as there can be multiple possible embodiments which are not expressly illustrated in the present disclosures. It is also to be understood that the terminology used in the description is for the purpose of describing the particular versions or embodiments only, and is not intended to limit the scope of the present application.

Another objective is to provide a method and system for analyzing large code base by splitting the large code base into small code clusters.

Another objective is to provide a method and system for analyzing small code clusters individually and combining the results obtained from the analyzed small code clusters to represent the result for the entire code base.

Yet another objective is to provide a method and system for analyzing large code base for defect detection in code, code reviews, code re-engineering, code reverse engineering, quality assurance of code and software program understanding.

In an embodiment, a method and system is provided for analyzing a large code base by splitting the large code base into small code clusters. The method and system is provided for analyzing small code clusters individually and combining the results obtained from the analyzed small code clusters to represent the result for the entire code base. The method and system is provided for analyzing large code base for defect detection, code review or program understanding.

The present application provides a scalable method for analysis of large code base, wherein the method includes receiving at least one source code file which is associated with a large code base. Further at least one entry procedure is identified and a reference graph of procedures associated with the source code file is derived. The large code base is then partitioned into at least two smaller code clusters in accordance with the pre-identified entry procedure, each cluster comprising plurality of procedures and variables referred directly or transitively from the associated entry procedure thereof The method and system further analyze the partitioned code clusters individually and combine the result obtained from the analyzed code clusters for further representing for the entire code base for analyzing the large code base.

The above said method and system are preferably for analyzing large code base using partitioning but also can be used for many other applications.

BRIEF DESCRIPTION OF THE DRAWINGS

The foregoing summary, as well as the following detailed description of preferred embodiments, is better understood when read in conjunction with the appended drawings. There is shown in the drawings example embodiments, however, the application is not limited to the specific system and method disclosed in the drawings.

DETAILED DESCRIPTION

Figure 1:
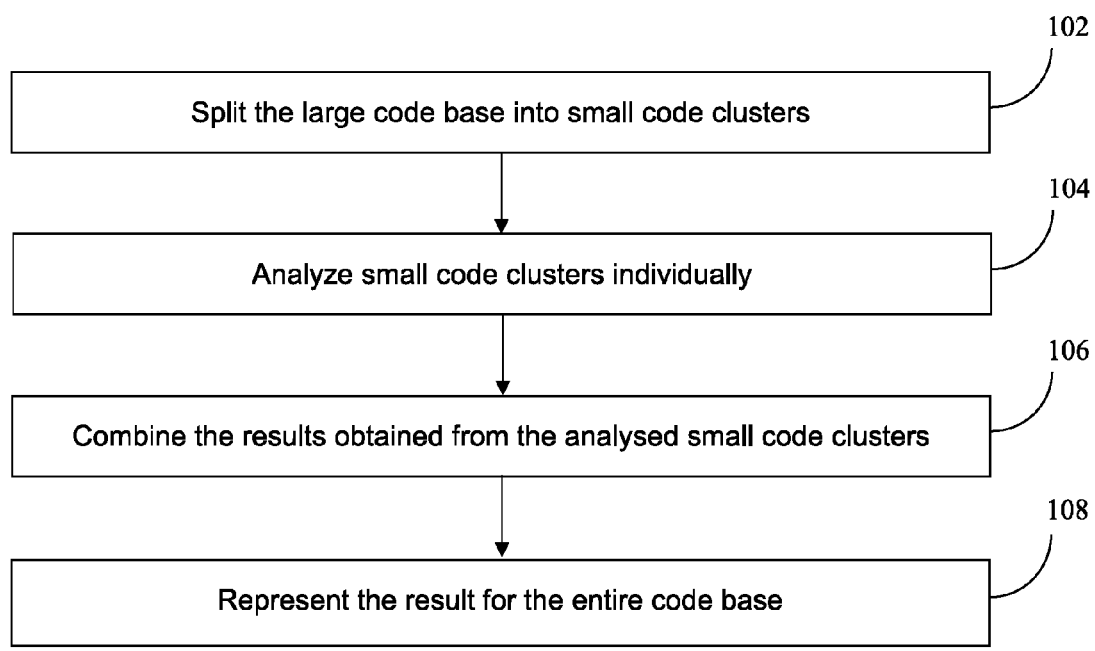
FIG. 1 shows flow diagram of the process for program analysis of a large code base using partitioning.

Some embodiments, illustrating its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any methods, and systems similar or equivalent to those described herein can be used in the practice or testing of embodiments, the preferred methods, and systems are now described. The disclosed embodiments are merely exemplary.

The present application enables a method and system for analyzing large code base using partitioning. Particularly, the application enables a method and system for analyzing large code base by splitting the large code base into small code clusters. More particularly, the application enables a method and system for analyzing small code clusters individually and combining the results obtained from the analyzed small code clusters to represent the result for the entire code base. Further, the method and system analyze a large code base for defect detection in code, code reviews, code re-engineering, code reverse engineering, quality assurance of code and software program understanding.

A scalable method for analysis of large code base is disclosed; the method comprises processor implemented steps of:
a) receiving at least one source code files associated with a large code base;
b) identifying at least one entry procedure and deriving a reference graph of procedures associated with the source code file;
c) partitioning the large code base into at least two smaller code clusters in accordance with the pre-identified entry procedure, each cluster comprising plurality of procedures and variables referred directly or transitively from the associated entry procedure thereof;
d) analyzing the partitioned code clusters individually;
e) combining result obtained from the analyzed code clusters; and
f) representing the combined result for the entire code base for analyzing the large code base.

A scalable system for analysis of large code bases can include:
a) a source file of a code base comprising plurality of procedures and at least one entry procedure;
b) a procedure reference graph comprising a relationship map of plurality of procedures derived from the inputted source file;
c) a cluster comprising plurality of procedures and variables referred directly or transitively from the associated entry procedure thereof;
d) a plurality of global variables referred therefrom the each cluster;

e) a means for partitioning the large code base into at least two smaller code clusters;
f) a means for analyzing the partitioned code clusters individually;
g) a means for combining result obtained from the analyzed code clusters; and
h) means for representing the combined result for the entire code base for analyzing the large code base.

Referring to FIG. 1 is a flow diagram of the process for program analysis of a large code base using partitioning.

The process starts at the step 102, the large code base is split into small code clusters. At the step 104, small code clusters are analyzed individually. At the step 106, the results obtained from the analyzed small code clusters are combined. The process ends at the step 108, the result for the entire code base is represented.

The approach of clustering to form sub-systems (clusters) is used and each such sub-system (clusters) is submitted as a cluster-to-be-analyzed to the analysis tools.

The clustering algorithm preserves the system behavior—the results of analyzing the complete application will be the same as merging the analysis results of individual clusters. This is possible because the analysis results that we are interested in are intra-process which do not require the effect of concurrency to be taken into account. The clustering algorithm works on the concept of a top-level function. It has been termed a function as top-level if it is called from nowhere within the code base. Every cluster has been considered as a set of functions. Clustering is done such that a cluster satisfies the following properties:

Every cluster contains one top-level function. This top-level function is termed as cluster-head function.

Every function of a cluster is reachable through some call chain from the cluster-head function.

No two different clusters have the same cluster-head function.

Every top level function is a cluster-head function in some cluster.

The entire software code is divided into clusters such that all the above properties hold. Finally an analyzable-cluster is formed by collecting all files which have definitions of all the functions in a cluster. Additional files having definitions of variables referred from this cluster are also added. There may be lot of overlap of functions among these clusters. The cluster-head function of a cluster is treated as an entry-point by the analysis tools facilitating each individual cluster to be analyzed combinely as a single cluster.

Figure 2:
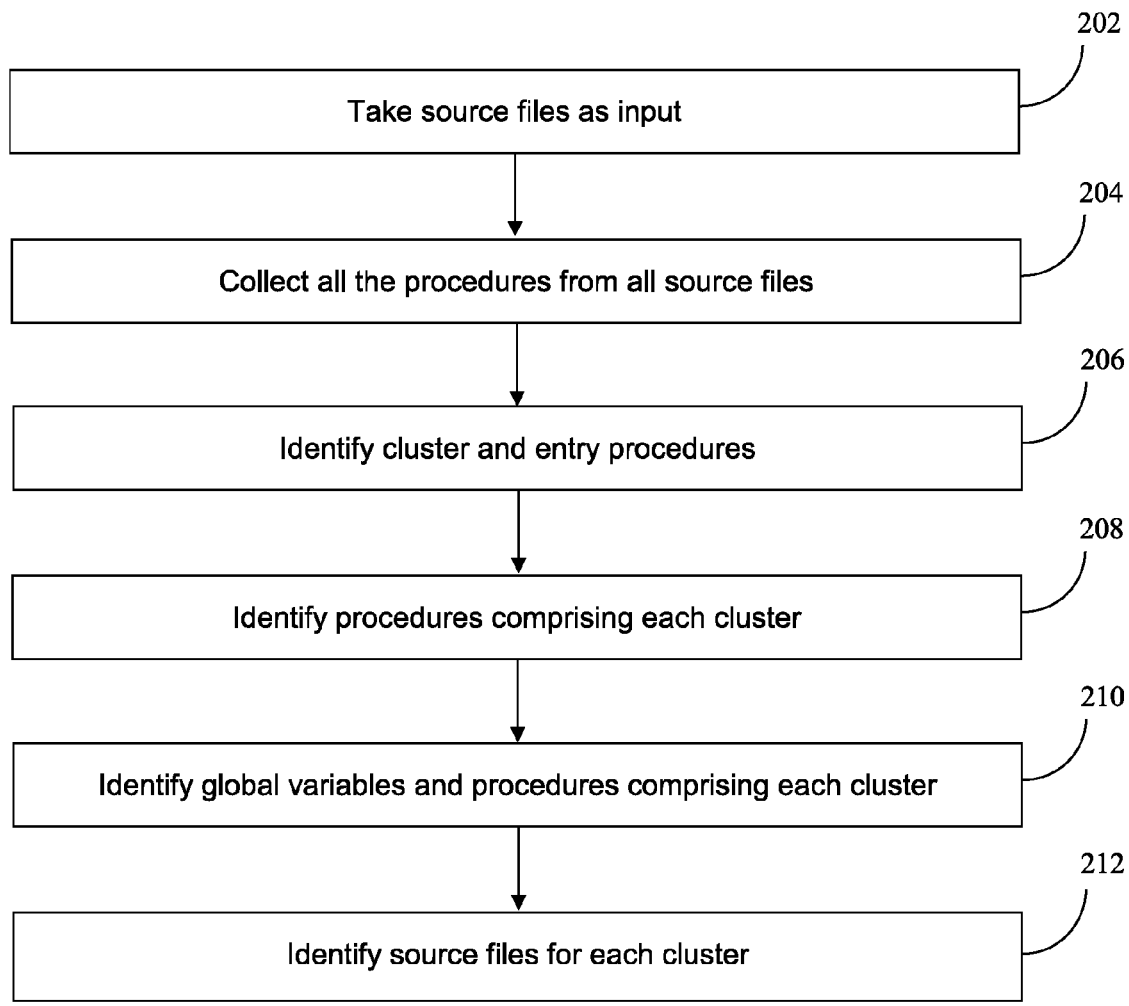
FIG. 2 shows flow diagram of the process of partitioning of a large code base.

Referring to FIG. 2 is a flow diagram of the process of partitioning of a large code base.

The process starts at the step 202, the source files are taken as an input. At the step 204, all the procedures are collected from all source files. A procedure reference graph is created which depicts a referrer-referred relationship. For an example, if a procedure P is referred from the body of Q then Q refers P. At the step 206, clusters and entry procedures are identified. Every procedure node having an in-degree as zero and which is not referred from a global variable's definition is known as an entry-procedure. A cluster for each such entry-procedure is created. It is assumed that procedures which are either recursive or referred in global variable's definition can not be considered as an entry-procedure. At the step 208, procedures comprising each cluster are identified. In each cluster, procedures which are referred directly or transitively from its entry procedure are included. At the step 210, global variables and procedures comprising each cluster are identified. For each cluster, the global variables are identified which are referred from the cluster. All procedures and variables which are referred directly or transitively in the initialization of these global variables are included in the cluster. The process ends at the step 212, source files for each cluster are identified. For each cluster, the source files are identified which contain either any procedure which is part of cluster or have definition of global variables which are referred in any of the procedures of cluster. The identified clusters may be analyzed by a program analysis tool.

Figure 3:
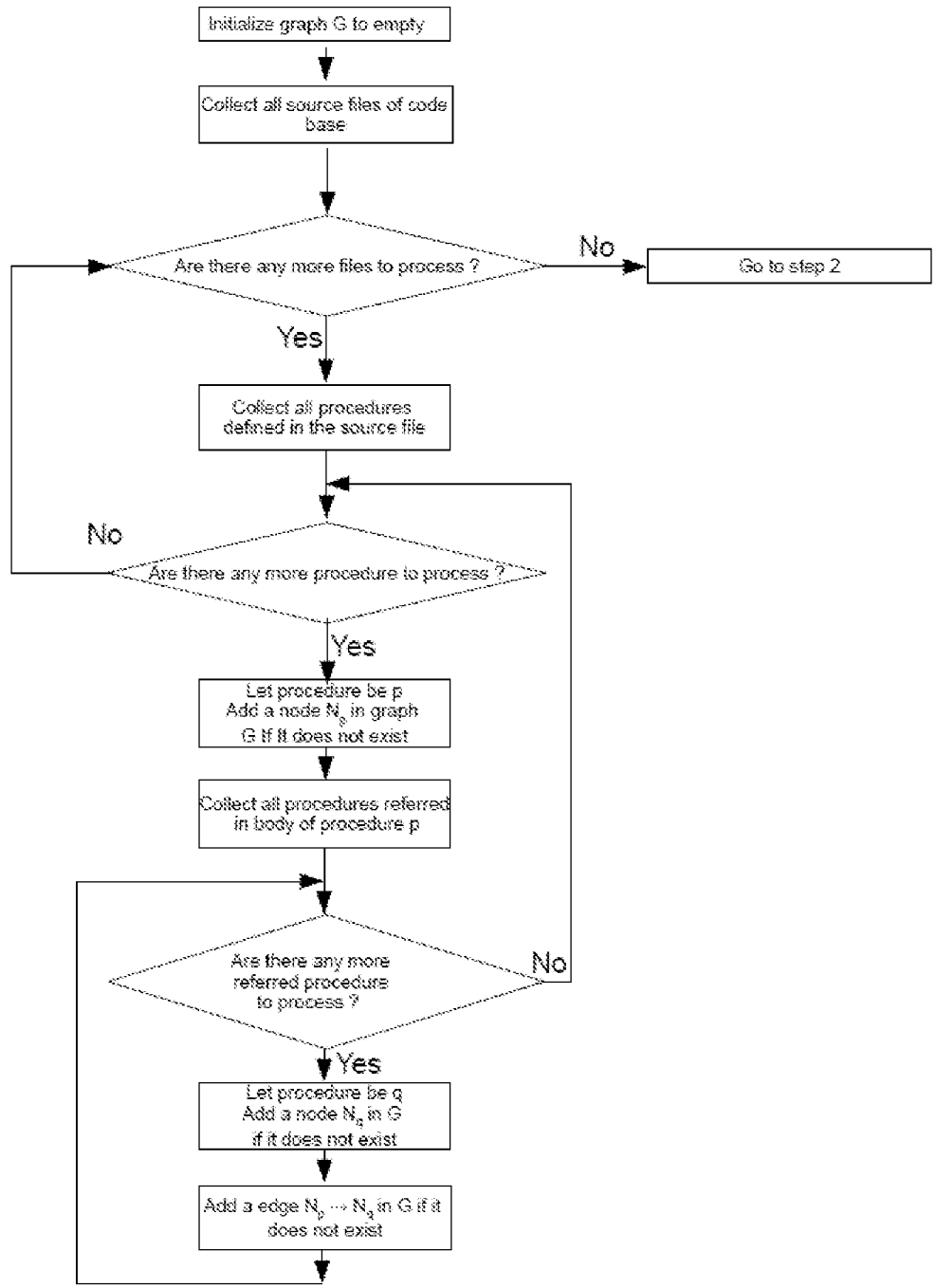
FIG. 3 shows flow diagram of the process of the collection of procedures.

Referring to FIG. 3 is a flow diagram of the process of the collection of procedures.

In an embodiment of the invention, all the procedures are collected from all source files. A procedure reference graph is created which depicts a referrer-referred relationship. For an example, if a procedure 'P' is referred from the body of 'Q' then 'Q' refers 'P'.

The reference graph 'G' initialize to empty. All source files of code base are collected. If there are no more files to process then the process moves to next step for identifying clusters and entry-procedures. If there are more files to process, all procedures defined in the source file are collected.

If there are no more procedures to process the process moves to check, if there are no more files to process then the process moves to next step for identifying clusters and entry-procedures. If there are more files to process, all procedures defined in the source file are collected. If there are more procedures to process, let the procedure be 'p' and add a node 'Np' in the reference graph 'G' if it does not exist. All the procedures referred in the body of procedure 'p' are collected.

If there are no more referred procedure to process the process moves to check, if there are any more procedures to process. If there are no more procedures to process the process moves to check, if there are no more files to process then the process moves to next step for identifying clusters and entry-procedures. If there are more files to process, all procedures defined in the source file are collected. If there are more referred procedure to process, let procedure be 'q' and add a node 'Nq' in the reference graph 'G' if it does not exist.

Add a edge 'Np→Nq' in the reference graph 'G' if it does not exist and check, If there are no more referred procedure to process the process moves to check, if there are any more procedures to process. If there are no more procedures to process the process moves to check, if there are no more files to process then the process moves to next step for identifying clusters and entry-procedures. If there are more files to process, all procedures defined in the source file are collected. If there are more referred procedures to process, let procedure be 'q' and add a node 'Nq' in the reference graph 'G' if it does not exist.

Figure 4:
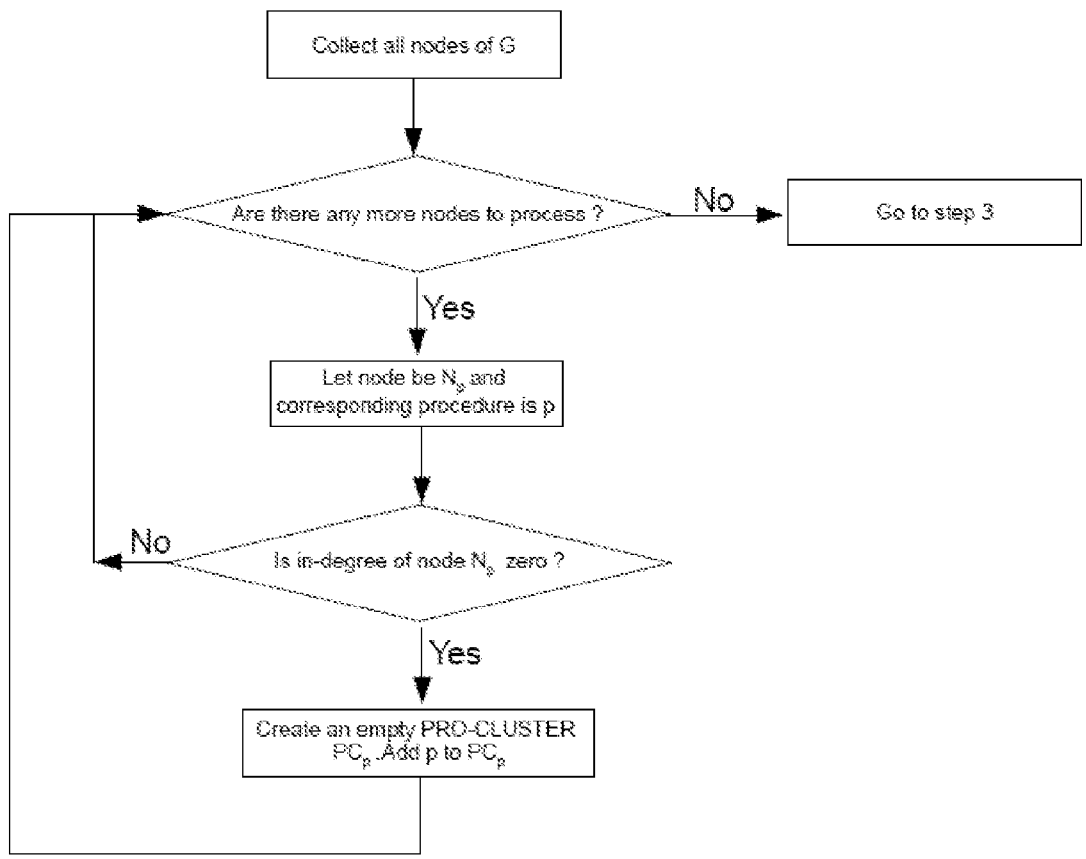
FIG. 4 shows flow diagram of the process of the Identifying clusters and entry-procedures.

Referring to FIG. 4 is a flow diagram of the process of the Identifying clusters and entry-procedures.

Clusters and entry procedures are identified. Every procedure node having an in-degree as zero and which is not referred from a global variable's definition is known as an entry-procedure. A cluster for each such entry-procedure is created. It is assume that procedures which are either recursive or referred in global variable's definition can not be considered as an entry-procedure.

All nodes of the reference graph 'G' are collected. If there are no more nodes to process, the process moves to next step for identifying procedures comprising each cluster. If there are more nodes to process, let node be 'Np' and corresponding procedure is 'p'. If in-degree of node 'Np' is not zero, the process moves to check, if there are no more nodes to process, the process moves to next step for identifying procedures comprising each cluster. If in-degree of node 'Np' is zero, create an empty PRO-CLUSTER 'PCp'. Add 'p' to 'PCp' and further check, if there are no more nodes to process, the process moves to next step for identifying procedures comprising each cluster.

Figure 5:
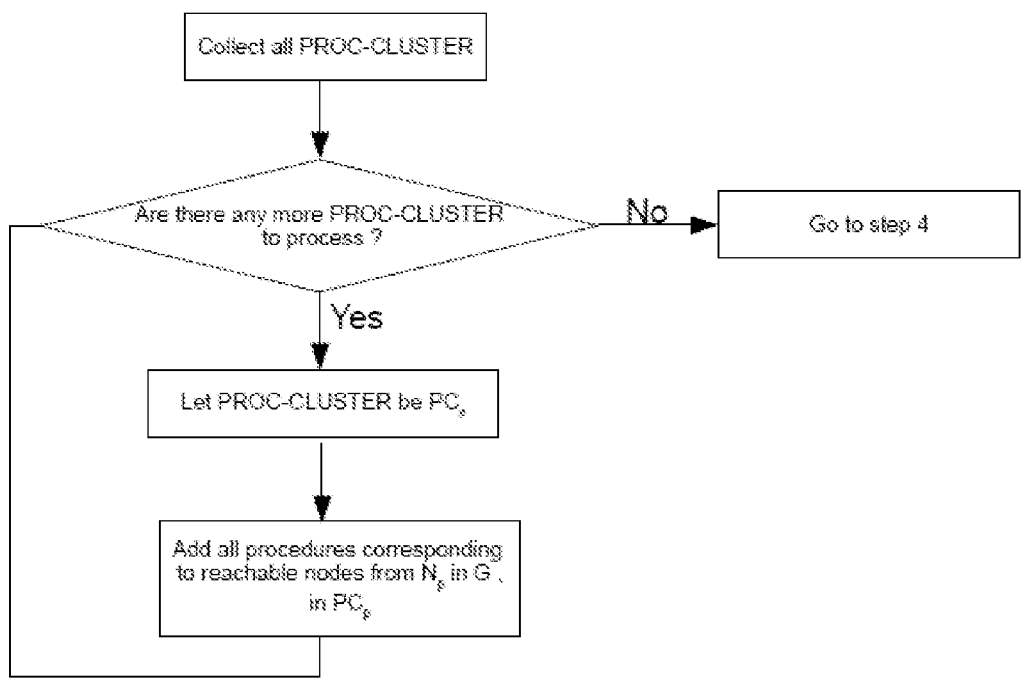
FIG. 5 shows flow diagram of the process of the Identifying procedures comprising each cluster.

Referring to FIG. 5 is a flow diagram of the process of the Identifying procedures comprising each cluster.

Procedures comprising each cluster are identified. In each cluster, procedures which are referred directly or transitively from its entry procedure are included.

All the PROC-CLUSTERS are collected. If there are no more PROC-CLUSTERS to process, the process moves to next step for identifying global variables and additional procedures comprising each cluster. If there are more PROC-CLUSTERS to process, let PROC-CLUSTER be 'PCp' and add all procedures corresponding to reachable nodes from 'Np' in the reference graph 'G', in 'PCp'.

Figure 6:
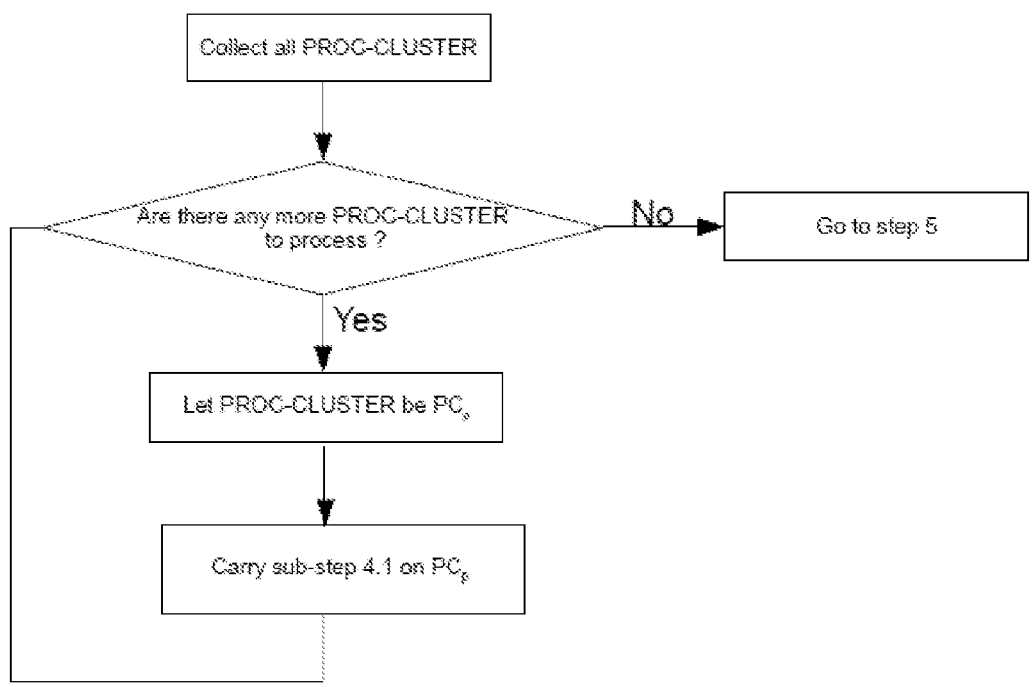
FIG. 6 shows flow diagram of the process of the Identifying global variables and additional procedures comprising each cluster.

Referring to FIG. 6 is a flow diagram of the process of the Identifying global variables and additional procedures comprising each cluster.

Global variables and procedures comprising each cluster are identified. For each cluster, the global variables are identified which are referred from the cluster. All procedures and variables which are referred directly or transitively in the initialization of these global variables are included in the cluster.

All the PROC-CLUSTERS are collected. If there are no more PROC-CLUSTERS to process, the process moves to next step for identifying source files for each cluster. If there are more PROC-CLUSTERS to process, let PROC-CLUSTERS be 'PCp' and identifying global variables and additional procedures for a cluster on 'PCp'.

Figure 7:
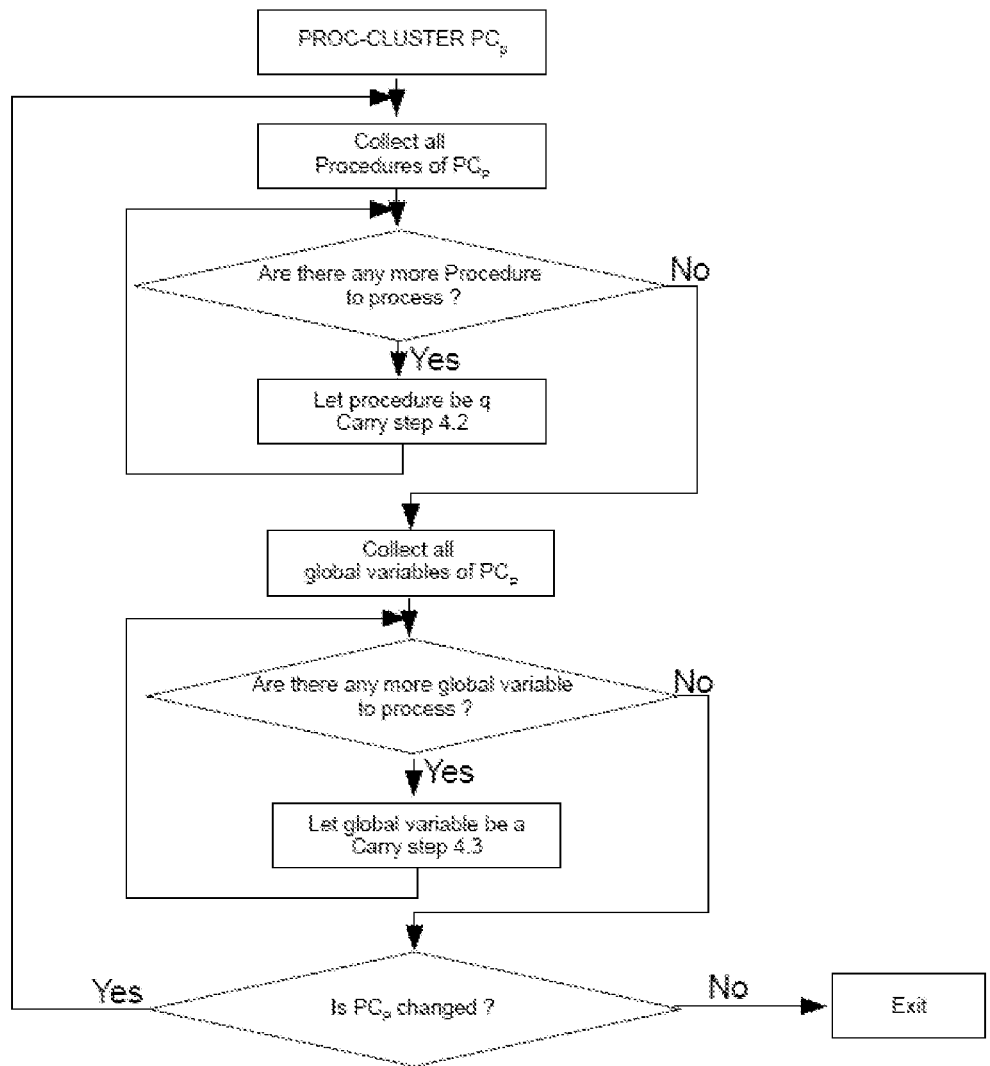
FIG. 7 shows flow diagram of the process of the Identifying global variables and additional procedures for a cluster.

Referring to FIG. 7 is a flow diagram of the process of the Identifying global variables and additional procedures for a cluster.

Consider the PROC-CLUSTER 'PCp', and Collect all the procedures of 'PCp'. If there are more Procedure to process, let the procedure be q and Identifying global variables due to a procedure and check again If there are more Procedure to process. If no, then collect all global variables of 'PCp' and check if there are more global variable to process, let global variable be 'a' and identify additional global variables and procedures due to initialization of a global variable. Check again if there are more global variable to process. If no, then check if Is 'PCp' changed. If no then the process exit, if yes, collect all the procedures of 'PCp'.

Figure 8:
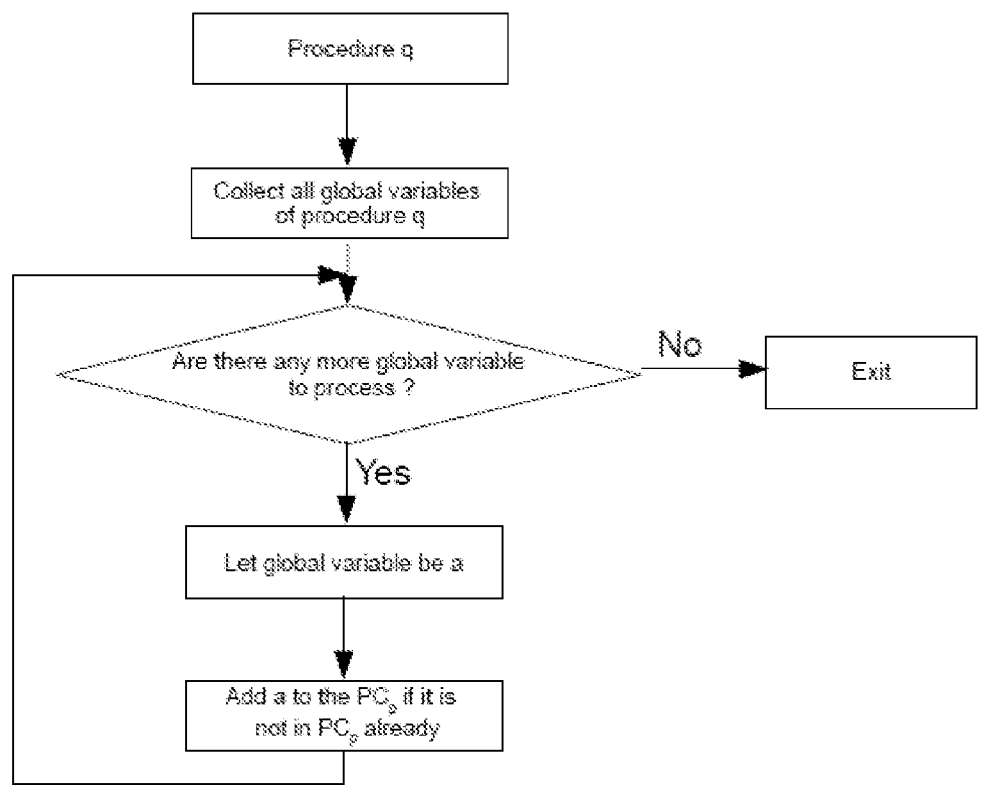
FIG. 8 shows flow diagram of the process of the Identifying global variables due to a procedure.

FIG. 8 shows flow diagram of the process of the Identifying global variables due to a procedure.

Consider the Procedure 'q', and collect all the global variables of procedure 'q'. If there are no more global variable to process, then the process exit. If there are more global variable to process, Let global variable be 'a' and add 'a' to the 'PCp' if it is not in 'PCp' already. Check again, if there are no more global variable to process, then the process exit.

Figure 9:
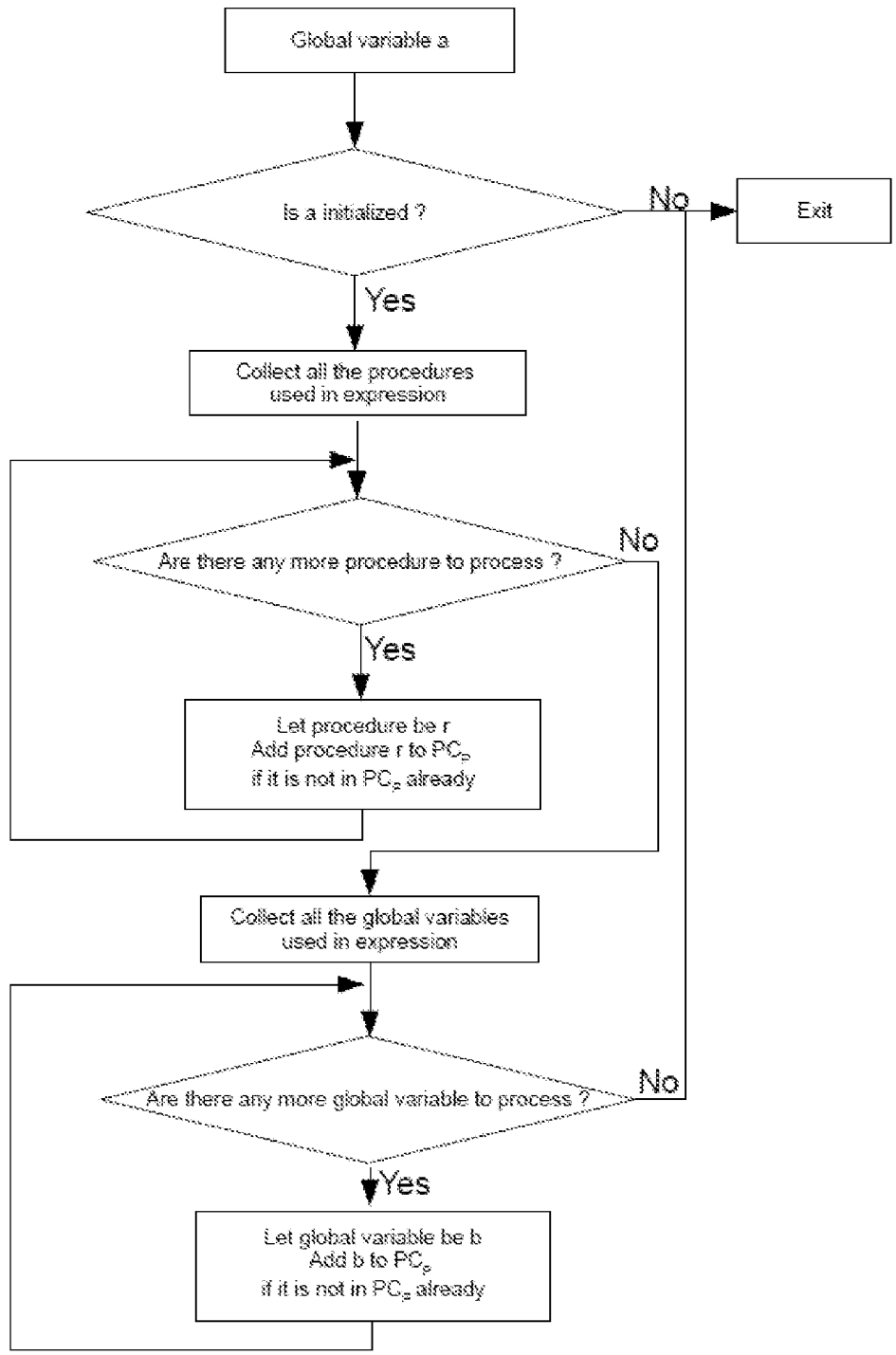
FIG. 9 shows flow diagram of the process of the Identifying additional global variables and procedures due to initialization of a global variable.

FIG. 9 shows flow diagram of the process of the Identifying additional global variables and procedures due to initialization of a global variable.

Consider the Global variable 'a'. Check, if 'a' is initialized, if no then the process exits. If yes, then collect all the procedures used in expression. If there is more procedure to process, let procedure be 'r', and add procedure 'r' to 'PCp' if it is not in 'PCp' already. Check again, if there are no more procedure to process, collect all the global variables used in expression. If there are no more global variable to process, then the process exits. If there are more global variable to process, let global variable be 'b', and add 'b' to 'PCp' if it is not in 'PCp' already.

Figure 10:
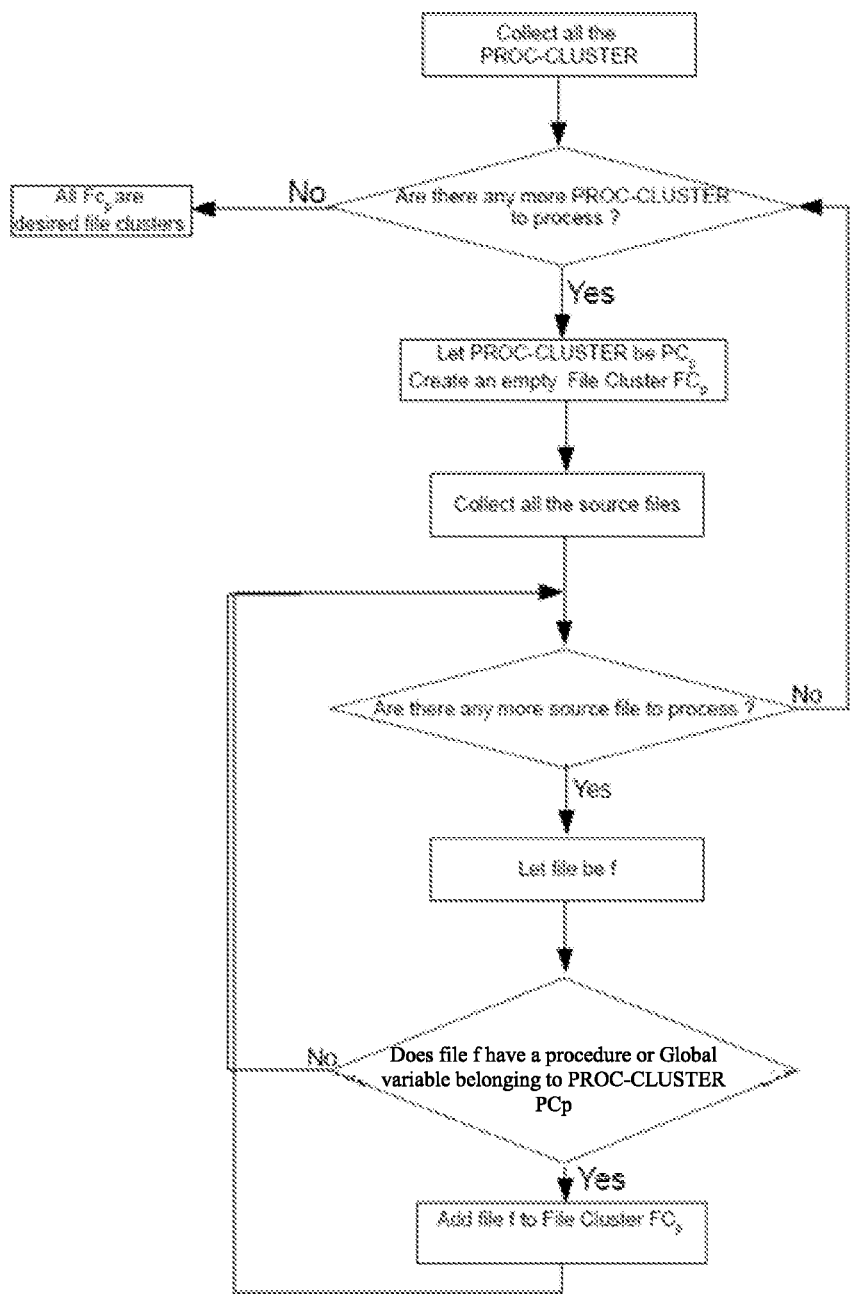
FIG. 10 shows flow diagram of the process of the Identifying source files for each cluster.

Referring to FIG. 10 is a flow diagram of the process of the Identifying source files for each cluster.

Source files for each cluster are identified. For each cluster, the source files are identified which contain either any procedure which is part of cluster or have definition of global variables which are referred in any of the procedures of cluster. The identified clusters may be analyzed by any program analysis tool.

All the PROC-CLUSTERS are collected. If there are no more PROC-CLUSTERS to process, All 'Fcp' are desired file clusters. If there are more PROC-CLUSTERS to process, let PROC-CLUSTER be 'PCp' and create an empty File Cluster 'FCp' following by collecting all the source files. If there are no more source file to process, the process moves to check, if there are no more PROC-CLUSTERS to process, All 'Fcp' are desired file clusters. If there are more PROC-CLUSTERS to process, let PROC-CLUSTER be 'PCp' and create an empty File Cluster 'FCp' following by collecting all the source files. If there are more source file to process, let file be 'f' and check if file 'f' have a procedure or global variable belonging to PROC-CLUSTER 'PCp'. If no then check if there are no more source file to process, the process moves to check, if there are no more PROC-CLUSTERS to process, All 'Fcp' are desired file clusters. If there are more PROC-CLUSTERS to process, Let PROC-CLUSTER be 'PCp' and create an empty File Cluster 'FCp' following by collecting all the source files. If yes let file be 'f' and check again if file 'f' have a procedure or global variable belonging to PROC-CLUSTER 'PCp'. If yes, add file 'f' to File Cluster 'FCp'.

The methodology and techniques described with respect to the exemplary embodiments can be performed using a machine or other computing device within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The machine may include a processor (e.g., a central processing unit (CPU), a graphics processing unit (GPU, or both), a main memory and a static memory, which communicate with each other via a bus. The machine may further include a video display unit (e.g., a liquid crystal display (LCD), a flat panel, a solid state display, or a cathode ray tube (CRT)). The machine may include an input device (e.g., a keyboard) or touch-sensitive screen, a cursor control device (e.g., a mouse), a disk drive unit, a signal generation device (e.g., a speaker or remote control) and a network interface device.

The disk drive unit may include a machine-readable medium on which is stored one or more sets of instructions (e.g., software) embodying any one or more of the methodologies or functions described herein, including those methods illustrated above. The instructions may also reside, completely or at least partially, within the main memory, the static memory, and/or within the processor during execution thereof by the machine. The main memory and the processor also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions, or that which receives and executes instructions from a propagated signal so that a device connected to a network environment can send or receive voice, video or data, and to communicate over the network using the instructions. The instructions may further be transmitted or received over a network via the network interface device.

While the machine-readable medium can be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: tangible media; solid-state memories such as a memory card or other package that houses one or more read-only (non-volatile) memories, random access memories, or other re-writable (volatile) memories; magneto-optical or optical medium such as a disk or tape; non-transitory mediums or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

The preceding description has been presented with reference to various embodiments. Persons skilled in the art and technology to which this application pertains will appreciate that alterations and changes in the described structures and methods of operation can be practiced without meaningfully departing from the principle, spirit and scope.

I claim:

1. A scalable method for analysis of a code base, the method comprising processor implemented steps of:
   receiving, by utilizing instructions that are executed by a processor, at least one source code file associated with the code base;
   identifying at least one entry procedure in the at least one source code file;
   partitioning the code base into at least two code clusters in accordance with the at least one entry procedure, wherein each of the at least two clusters comprises a plurality of procedures and a plurality variables referred from an associated entry procedure of the at least one entry procedure, each of the at least two code clusters comprising a unique top level function, wherein the unique top level function is not called from the code base;
   analyzing the at least two code clusters individually;
   combining results obtained from the analysis of the at least two code clusters; and
   representing a determination for the code base, wherein the determination is based on combining the results obtained from the analysis of the at least two code clusters and is utilized to analyze the code base.

2. The method of claim 1, further comprising:
   creating at least one cluster for each of the at least one entry procedure;
   identifying a plurality of global variables and a plurality of procedures comprising each of the at least one cluster; and
   identifying a plurality of source files for each of the at least one cluster for further analysis.

3. The method of claim 1, further comprising creating a procedure reference graph which depicts a referrer-referred relationship.

4. The method of claim 1, wherein the at least one entry procedure has an in-degree as zero.

5. The method of claim 1, wherein the at least one entry procedure is not referred from any other procedure.

6. The method of claim 2, wherein the plurality of global variables are referred from the at least one cluster.

7. The method of claim 2, wherein the plurality of procedures and the plurality of variables which are referred in an initialization of the global variables are included in the at least one cluster.

8. The method of claim 2, wherein the plurality of source files contain either any procedure which is part of the at least one cluster or a definition of the plurality of global variables which is referred in any of the procedures of the at least one cluster.

9. The method of claim 1, wherein the code base is analyzed for detecting a defect in code, code reviews, code re-engineering, code reverse engineering, quality assurance of code, software program understanding, or a combination thereof.

10. A system for analysis of a code base, the system comprising:
    a memory that stores instructions; and
    a processor that executes the instructions stored in memory to perform operations comprising:
    receiving at least one source code file associated with the code base;
    identifying at least one entry procedure in the at least one source code file;
    partitioning the code base into at least two code clusters in accordance with the at least one entry procedure, wherein each of the at least two clusters comprises a plurality of procedures and a plurality variables referred from an associated entry procedure of the at least one entry procedure, each of the at least two code clusters comprising a unique top level function, wherein the unique top level function is not called from the code base;
    analyzing the at least two code clusters individually;
    combining results obtained from the analysis of the at least two code clusters; and
    representing a determination for the code base, wherein the determination is based on combining the results obtained from the analysis of the at least two code clusters and is utilized to analyze the code base.

11. The system of claim 10, wherein the at least one entry procedure is a non-recursive procedure having a zero input degree and is not referred from a definition of a global variable.

12. The system of claim 10, wherein the the operations further comprise iteratively checking availability of additional code files, procedures contained in the additional code files, the cluster and entry procedures associated with the cluster for accomplishing processing of each node designated in the reference graph, or a combination thereof.

13. The system of claim 10, wherein
    the operations further comprise partitioning the code base by:
    creating at least one cluster for each of the at least one entry procedure;
    identifying the plurality of procedures comprising each cluster of the at least one cluster;
    identifying the plurality of global variables and the plurality of procedures comprising each of the at least one cluster; and
    identifying a plurality of source files for each cluster of the at least one cluster for further analysis.

* * * * *